March 28, 1939.  P. S. ENDACOTT  2,152,247
LOAD LIFTING AND WEIGHING DEVICE
Original Filed July 16, 1934   4 Sheets-Sheet 2

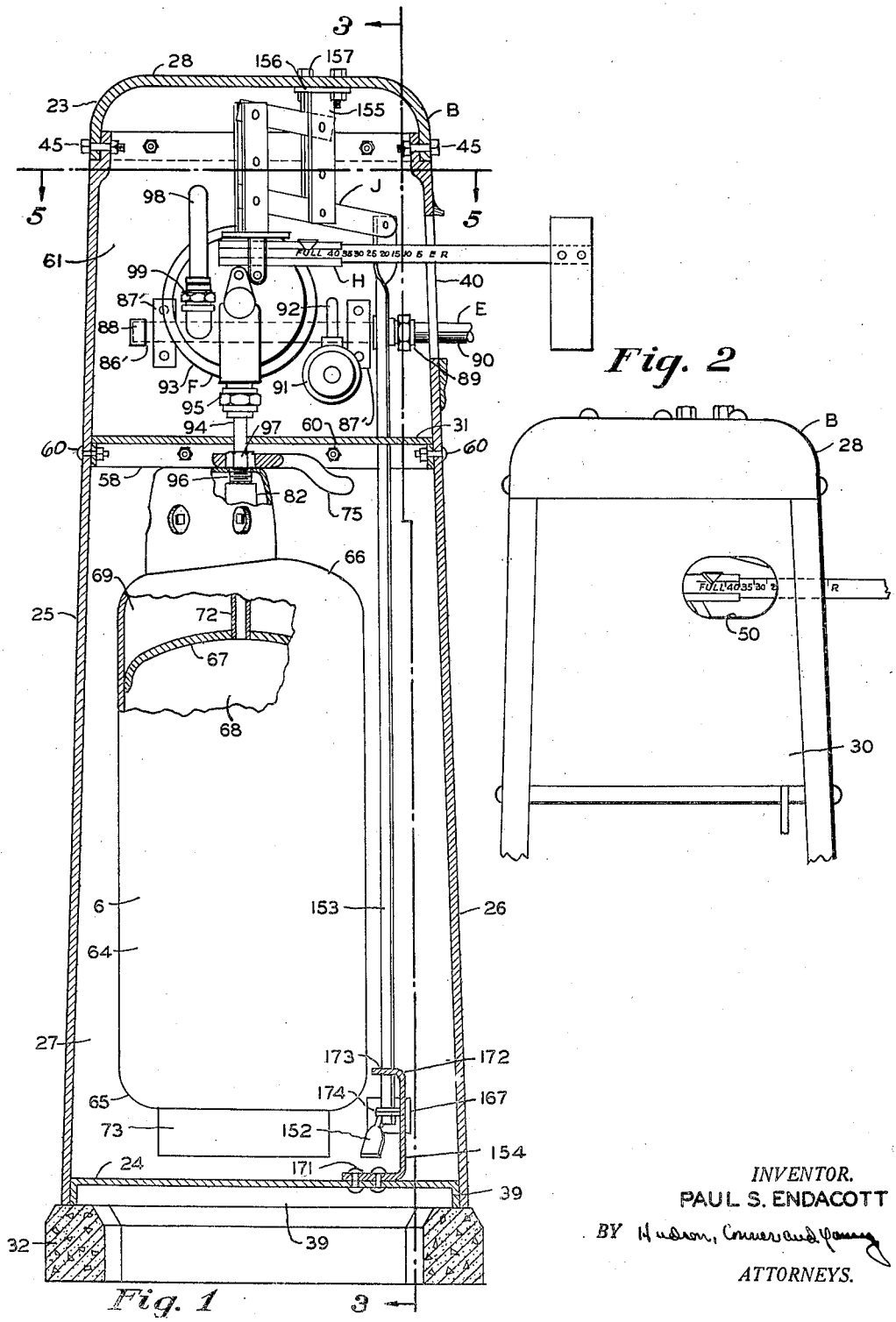

INVENTOR.
PAUL S. ENDACOTT
BY
ATTORNEYS.

March 28, 1939.    P. S. ENDACOTT    2,152,247
LOAD LIFTING AND WEIGHING DEVICE
Original Filed July 16, 1934    4 Sheets-Sheet 3
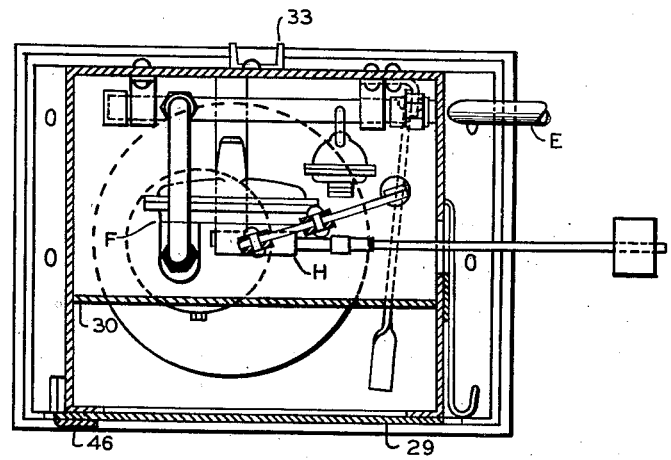
Fig. 5.
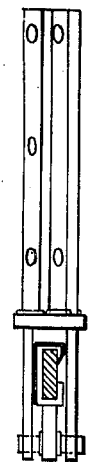
Fig. 8
Fig. 6
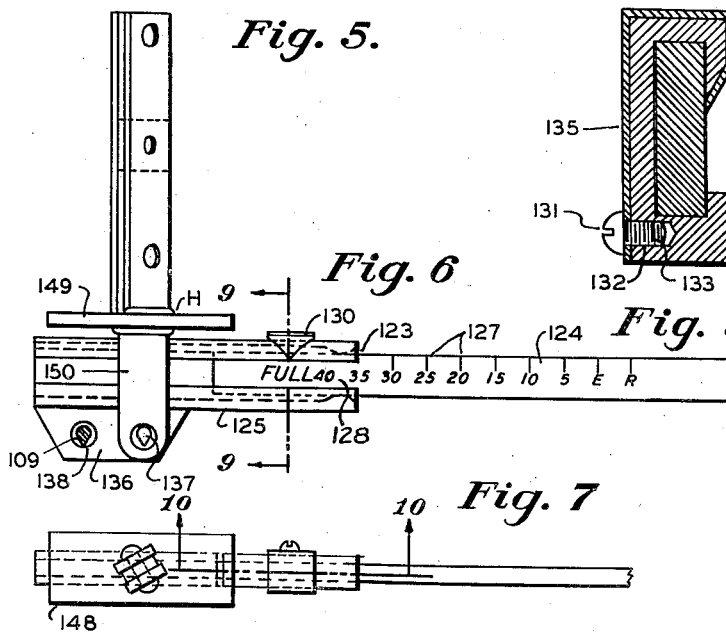
Fig. 9
Fig. 7
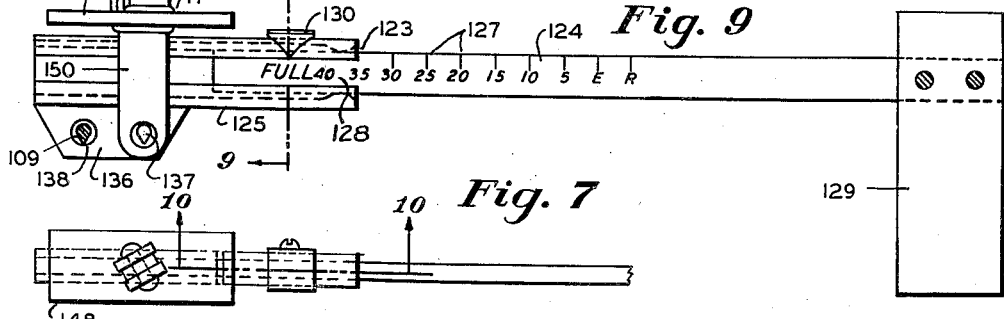
Fig. 10
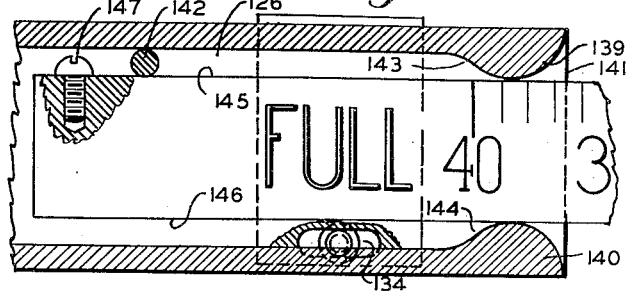
INVENTOR.
PAUL S. ENDACOTT
BY Hudson, Moses and Young
ATTORNEYS.

March 28, 1939.  P. S. ENDACOTT  2,152,247
LOAD LIFTING AND WEIGHING DEVICE
Original Filed July 16, 1934   4 Sheets-Sheet 4

INVENTOR.
PAUL S. ENDACOTT
BY Hudson, Conner and Young
ATTORNEYS.

Patented Mar. 28, 1939

2,152,247

UNITED STATES PATENT OFFICE 2,152,247

LOAD LIFTING AND WEIGHING DEVICE

Paul S. Endacott, Bartlesville, Okla., assignor to Phillips Petroleum Company, a corporation of Delaware Original application July 16, 1934, Serial No. 735,541. Divided and this application July 27, 1936, Serial No. 92,895

3 Claims. (Cl. 265—52)

This invention relates to equipment for the storage and utilization of liquefied petroleum gas, and more particularly to equipment well adapted for use by the consumer of propane and similar petroleum products used for heating, lighting and cooking purposes in and about the home, store, factory, etc.

The present invention embodies improvements in and additions to the equipment shown in Patents Nos. 1,976,719; 2,009,768; 2,019,004; 1,977,268; 1,994,337; and 1,994,338, and is a division of my co-pending application Serial No. 735,541, filed July 16, 1934, which has matured into Patent No. 2,047,953.

One of the main objects of the present invention is to provide equipment for use by the consumer of liquefied petroleum gas whereby the operations incident to utilization of the product are simplified, and numerous safeguards against accidents and injury to body and equipment are embodied in the equipment.

Another object of the invention is to provide storage and utilization equipment for liquefied petroleum gas where a single cabinet for each installation compactly houses a tank containing one or more supplies of liquefied gas as well as mechanism for raising the tank off the floor or base of the cabinet; a scale for weighing the tank contents; and, other devices and accessories incident to or desirable as a part of such equipment. The invention provides a compact arrangement in the cabinet of the tank and foot operated mechanism for quickly raising and lowering the scale and tank simultaneously so that a person may perform these operations while facing the equipment, without expending any great amount of energy, and so that even a comparatively frail person may attend to such transactions as are ordinarily necessary in self-service equipment.

Other objects of the invention are to provide the combination of a tank, a scale and load lifting and lowering mechanism which is compact, comprises but few parts, prevents undesirable movement of parts one with respect to another, and permits weighing of the tank contents without shutting off the supply of gas to the gas consuming appliances associated with the equipment; to provide an improved anti-friction telescopic scale beam arrangement; and, to provide an improved mechanism which causes the load to move in a predetermined path while being raised and lowered thereby preventing many destructive forces acting upon bearings of the scale and parts associated with the pressure reducing regulator.

Other objects and advantages of the invention will appear in the following detailed description, taken in connection with the accompanying drawings, forming a part of this specification and in which drawings:

Fig. 1 is a view partly in vertical section and partly in elevation, with parts broken away to disclose details, showing consumers' liquefied petroleum gas storage and utilization equipment constructed according to the present invention.

Fig. 2 is a fragmentary view in elevation of the upper portion of the cabinet and some of the parts carried thereby.

Fig. 5 is a horizontal-sectional view on the line 5—5 of Fig. 1.

Fig. 6 is an enlarged detail view in elevation of a scale forming a part of the equipment.

Fig. 7 is a plan view of the parts shown in Fig. 6.

Fig. 8 is an end elevation of the scale, a portion of the beam being shown in section to disclose details.

Fig. 9 is an enlarged detail sectional view on the line 9—9 of Fig. 6.

Fig. 10 is an enlarged vertical sectional view on the line 10—10 of Fig. 7.

Figure 3:
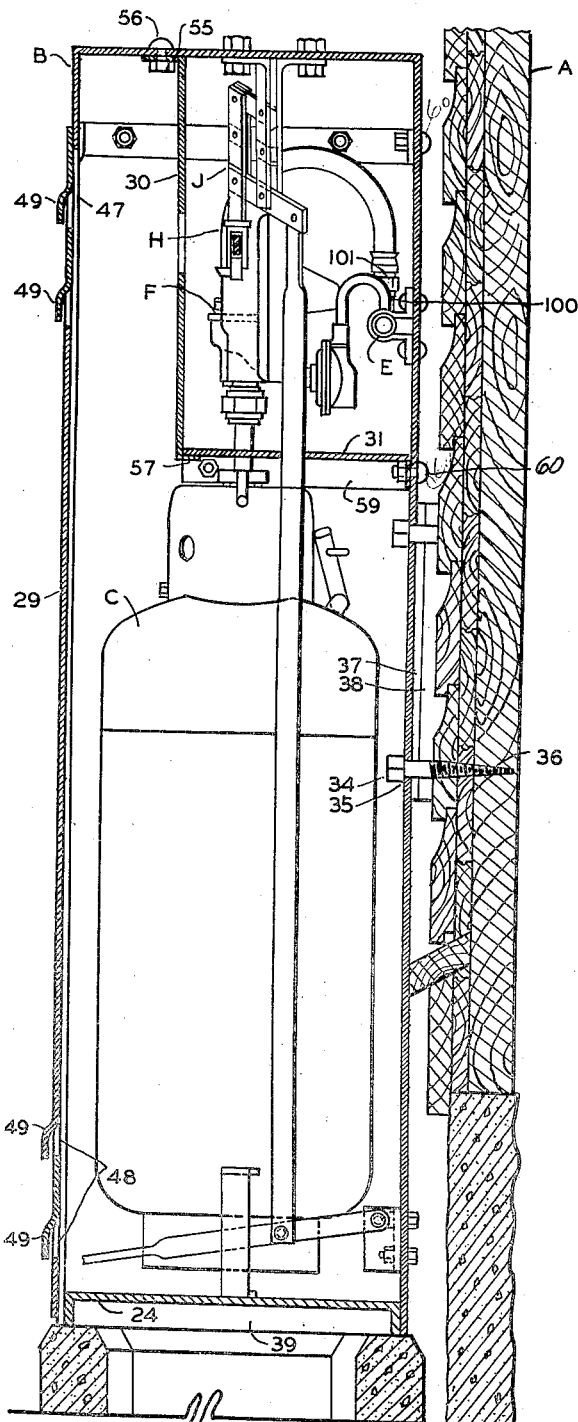
Fig. 3 is a vertical sectional view on substantially the line 3—3 of Fig. 1.
Figure 4:
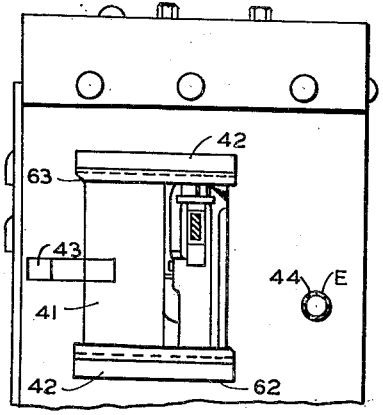
Fig. 4 is a fragmentary side elevation of the upper portion of the cabinet, provided with an opening for a scale beam.
Figure 11:
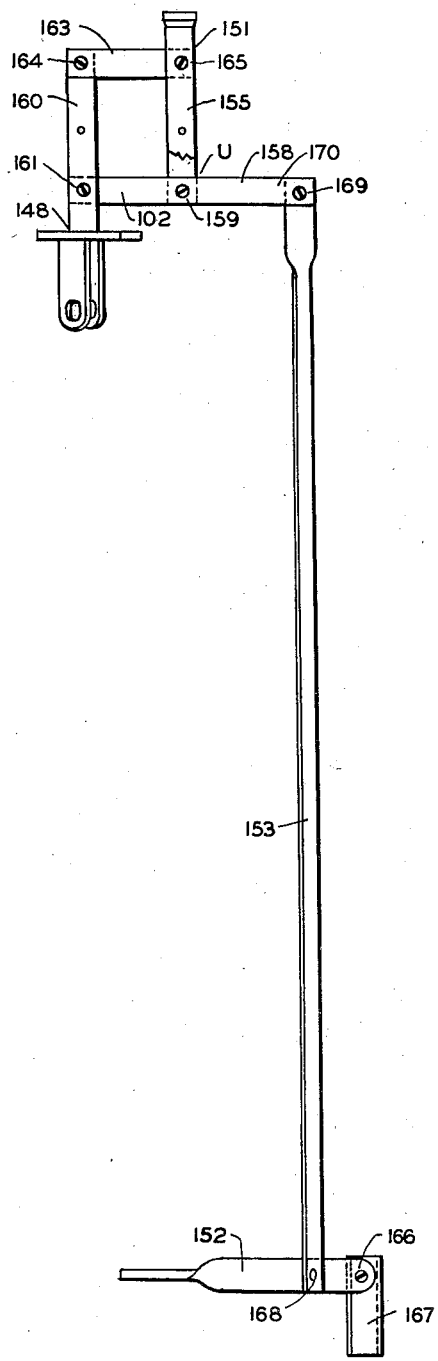
Fig. 11 is a detailed view in elevation of means for raising and lowering the tank and associated parts.
Figure 12:
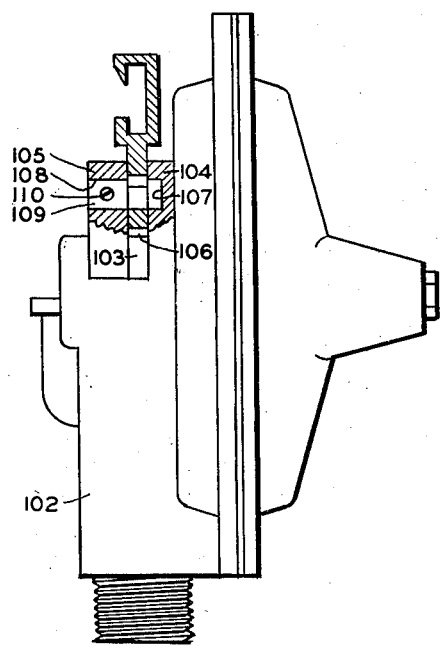
Fig. 12 is a side elevation of a pressure reducing regulator, a portion thereof being broken away and shown in section to disclose the association of the regulator with the scale.

In the drawings, where like reference characters designate like or corresponding parts throughout the views, A is a rigid support, such as the wall of a building; B is a cabinet which may be secured to support A; C a tank for high pressure liquefied petroleum gas, such as propane; E a consumer's conduit line for low pressure gas which may lead to any suitable gas conserving appliances, not shown in the drawings; F means for conducting fuel from tank C to line E at a reduced low pressure, as compared with the vapor pressure in the tank; H a scale and J means for raising and lowering the tank C; means F and scale H.

Referring first to the cabinet B, it comprises a body 23 including a bottom wall 24, side walls 25 and 26, a rear wall 27 and a top wall or cap 28; a door 29 for closing the open front of the body 23; a vertical screen wall or plate 30; and a horizontal screen wall or plate 31. The cabinet is elongated in shape and placed in an upright position. It is preferably of substantially truncated pyramidal shape, and may rest upon a base 32 of concrete or other suitable material. It is also preferred to strengthen the rear wall by a rolled metal section 33 such as a channel which serves to space the cabinet from the surface of support A, such as the outside wall of a building, to which the cabinet is secured as by lag screws 34, the heads 35 of which are on the inside of the cabinet and the shanks 36 of which pass through openings in the rear wall 27 and web 37 of section 33. The web 37 may be welded or otherwise secured to rear wall 27 and the flanges 38 of section 33 project outwardly from the rear wall for engagement with the support A, as shown in Figure 3.

The bottom wall 24 may be provided with downturned flanges 39, welded or otherwise secured to the walls 25, 26 and 27. The side wall 26 is provided with a scale beam opening 40 near its upper margin, which may be closed by a shutter 41 slidable in horizontal guides 42, the shutter being provided with a handle 43. Each side wall may also be provided with an opening 44 through either of which the consumer's conduit line E may pass. The openings 44 are located near the rear margins of the walls. While the top wall or cap 28 may be integral with the side and rear walls, it is preferred to make it a separate piece which may be secured to these walls by suitable fasteners 45, such as nuts and bolts. Thus the top wall or cap may be a casting or formed of sheet metal rendered sufficiently strong and sturdy so as to permit suspending the tank C, scale H and means F from the top wall or cap as shown in Figures 1 and 3. Door 29 may be hinged as at 46 to wall 25, and may be provided with top and bottom vent openings 47 and 48 with which are associated louvers 49. Adjacent side wall 26, the screen wall or plate 30 is provided with a sight opening 50 through which portions of the scale H may be viewed, as shown in Fig. 2. These screen walls or plates 30 and 31 may be secured to the cabinet body in any suitable manner. In the example shown wall 30 is provided with a horizontal flange 55 at its upper portion, secured to top wall or cap 28 as by fasteners 56 and at its lower margin may be provided with an inturned flange 57 to engage beneath wall 31. The latter is provided with a downturned rear flange 58 and downturned side flanges 59 which may be secured to the rear wall 27, and side walls 25 and 26, by fasteners 60. The fasteners 56 and 60 may be nuts and bolts which permit removal of these screen walls or plates if repairs, replacement of parts or adjustments are necessary. It will be noted that the walls 30 and 31 brace the upper portion of the cabinet by extending from side wall to side wall and being secured to the rear and top walls. They also form with the side walls, rear wall and top wall, a compartment 61 in the upper portion of the cabinet which is open laterally of the cabinet body at the scale beam opening 40. The guides 42 have longitudinal flanges 62, welded or otherwise secured to wall 26 adjacent the upper and lower margins of opening 40. Each guide may be provided with an inturned portion 63 at its end to limit sliding movement of the shutter 41 when the latter is in either open or closed relation to the opening 40.

The tank C is very much like that disclosed in my aforesaid Patent No. 2,019,004 in that it is elongated in shape and when in use for supply of gas to the consumer's conduit line E, is normally upright. It comprises a cylindrical body portion 64, a bottom wall 65, a top wall 66, and a partition 67 near the top wall providing a major compartment or chamber 68 and a minor compartment or chamber 69 for liquefied petroleum gas. A foot ring 73 may be provided on the lower or bottom wall 65.

The consumer's conduit line E includes a pipe 86' which may be rigidly secured in the compartment 61 of the cabinet, to the rear wall 27, by brackets 87', which space is a suitable distance from the wall 27 so as to permit placing and removal of a cap 88 which may be placed on either end of the pipe 86', and a union 89 which joins a pipe 90 to the uncapped end of pipe 86'. Pipe 90 leads through the opening 44 in side wall 26 and to the gas consuming appliances not shown in the drawings. An outlet pressure relief valve 91 may be provided in compartment 61, connected to pipe 86' by a goose neck 92.

Fluid from the tank C finds its way to the line E through suitable valves, not shown, and means F which will now be described. It includes a pressure reducing regulator 93 which, through a pipe 94 coupled to the high pressure inlet of the regulator by union 95, and to the tank C by a coupling 96, forms a suitable suspension device between the scale H and tank C. The coupling 96 includes a wrench head 97 which receives the wrench 75. The low pressure outlet of regulator 93 has communication with pipe 86', through flexible conduit 98, it being connected to the regulator by union 99, and to a nipple 100 of pipe 86 by a union 101. The pipe 94 extends through the screen plate 31 in the manner described in the parent application. The regulator 93 has preferably cast integral with its front cover plate 102, a clevis-like portion 103, including lugs 104 and 105, spaced apart to provide a mouth 106 which opens upwardly to receive a portion of scale H as hereinafter described. Lug 104 is provided with a recess 107 open to mouth 106 and lug 105 has a bore 108 axially aligned with recess 107. The bore 108 and recess 107 receives a pivot pin 109 extending across mouth 106, and held against rotation by a transverse pin 110 carried by lug 105.

The scale H is very much like that disclosed in the aforesaid Patent No. 2,009,768, in that it includes a scale beam 123 including a stem section 124 and a sleeve-like section 125 embracing section 124, providing a slideway 126 for receiving the stem section, so that the latter may be moved to extend entirely through the sleeve-like section 125 or have merely its inner end portion in the slideway as shown in Figure 6. The stem section is provided with graduations and other indicia 127 thereon, which may be viewed through a slot or sight opening 128 of section 125. It is also provided with a counterweight or poise 129 at its end remote from section 125. An indicator 130 is adjustably carried by section 125 as by set screw 131 having screw threaded engagement in bore 132 in section 125, the shank 133 of the screw extending through an elongated slot 134 in the back plate 135 of the indicator. Sleeve section 125 also has a depending web 136 extending longitudinally of the lower portion thereof provided with suspension pivot 137 and an opening 128 receiving the aforesaid pin 109. The improved scale beam 123 is provided with antifriction bearings 139 and 140 at the mouth 141 of slideway 126 and an antifriction bearing 142 remote from its mouth for engagement with the edges of stem section 124. The bearings 139 and 140 may be projections cast or formed as a part of the section 124, provided with arcuate faces 143 and 144, respectively, having line contact with the top and bottom edges 145 and 146, respectively, of the stem section. The bearing 142 may be a cylindrical pin rigid with the upper portion of section 125 and extending across the slideway 126 for line contact with the upper edge 145 of stem section 124. In order to limit outward sliding movement of the stem section, it is provided with a stop pin 147 at its end opposite to poise 129 which may engage bearing 142 as is obvious from an inspection of Figure 10. The scale is suspended from a vertical hanger 148 including a horizontal stop bar 149 above the sleeve-like section 125 and depending arms 150 which embrace said section and have pivotal connection with the pivot 137. In Figure 1 the stem section of the scale is shown extending through the opening 40 in wall 26, so as to expose the poise 129 to view exteriorly of the cabinet where it may act as a signal, by moving downwardly as the liquefied petroleum gas in tank C is used and hence the load on the scale becomes lighter in weight. The stop bar 149 limits the amplitude of oscillation of sleeve section 125 on the hanger 148. It is to be noted also that the stem sections may be moved to a position entirely in compartment 61, at which time the shutter 41 may be closed.

In order that the scale, tank and connection between the two may be quickly and conveniently raised and lowered, the means J is provided. It differs from the mechanism shown in the aforesaid Patent No. 2,009,768 in that the operator is not required to reach into the upper part of the cabinet but may, while facing the screen plate 30, operate the mechanism with the right foot. It preferably comprises a parallelogram mechanism 151, a foot lever 152, a link 153 between the lever 152 and mechanism 151 to operate the latter movement of the former, and a catch device 154 associated with the lever 152. The mechanism 151 preferably includes spaced vertical arms 155 secured to the cabinet top 28 as by attaching plate 156 and bolts 157, a lever 158 pivoted intermediate its ends as at 159 to the lower end portion of arms 155, spaced vertical arms 160 of hanger 148 pivoted intermediate their ends, as at 161, to one end portion 162 of lever 158, and a link 163 parallel to lever 158, pivotally connected as at 164 to the upper end portion of arms 160, and to vertical arms 155 as at 165. The foot lever 152 may be pivoted, as at 166, to a bracket 167, secured to the rear wall 27 of the cabinet. Remote from pivot 166, the link 153 is pivoted to the lever, as at 168 and it extends vertically thru a perforation in bottom screen plate 31, with its upper end portion pivoted, as at 169 to the other end portion 170 of lever 158. The catch device 154 may be secured to the bottom wall 24 of the cabinet, as by rivets 171, a vertical arm 172 of the catch device having laterally projecting lugs 173 and 174 beneath which the foot lever may come to rest when the tank is either raised or lowered. The pivotal connection between foot lever 152 and bracket 167 is sufficiently loose to permit the foot lever being moved laterally, so as to disengage it from a position beneath lug 174 thereby permitting the tank and associated parts to be lowered, the foot lever 152 engaging beneath lug 173 to limit the downward movement of the scale and regulator. It is to be observed that the parallelogram mechanism 151 supports the scale in a manner that it is not likely to be injured even tho the extended stem section and poise 129 be subjected to considerable wind force. By making the cabinet of truncated pyramidal shape, there is ample room in the cabinet at the lower portion thereof, for the foot lever 152 and the catch device 154, laterally of the tank, as is very clear from an inspection of Figure 5.

After connecting the tank to the dispensing equipment on the consumer's premises, the scale may be brought into use to verify any claim that a filled tank has been furnished, since the word "full" on the stem portion of the scale beam may be observed thru the sight openings 50 and 128 and the scale beam will balance when the indicator 130 points to the word "full" if such is a fact. After such weighing operation, the operator may move the stem section of the scale beam so that the indicator points to such indicia on the stem section as desired, such as one representing "empty" thus adapting the scale for signalling purposes. For instance, if so set, the poise 129 will descend when the major supply of liquefied petroleum gas in the tank C is depleted. If it is not desired to use the scale beam as a signal device, it may be adjusted so that the stem section is wholly within the cabinet, and the shutter 41 may be moved to a closed position. There need be no interruption of flow of low pressure gas to the gas consuming appliances during a weighing operation. A changeover from the major to the minor or reserve supply may be readily accomplished by manipulation of valves, shown in the parent application, but not shown in the present application.

Various minor details have been specifically referred to in the foregoing specification, and it is to be understood that these may be varied without departing from the invention as set forth in the following claims.

Having described my invention, what I claim is:

1. In a load lifting and weighing device, the combination of a rigid support, a vertical arm rigid with said support, a lever pivoted intermediate its ends to the lower portion of said vertical arm to swing in a vertical plane, a vertical hanger pivoted intermediate its ends to one end portion of said lever, a scale at the lower portion of said hanger, a link parallel to said lever pivotally connected to the upper end portion of said hanger and to said vertical arm, and means connected to the other end portion of said lever for raising and lowering the same and retaining it in a fixed position.

2. In a scale, a beam comprising a stem section, a sleeve-like section embracing said stem section and provided with a slide-way for receiving the stem section so that the latter may be moved into and out of the sleeve-like section, said slide-way at its mouth provided with bearings for engaging the top and bottom edges of said stem section, and a third bearing in the slide-way remote from the mouth thereof, engaging the top edge of said stem section.

3. In a scale, a beam comprising a stem section, a sleeve-like section embracing said stem section and provided with a slide-way for receiving the stem section so that the latter may be moved into and out of the sleeve-like section, said slide-way at its mouth provided with bearings engaging the top and bottom edges of said stem section, a third bearing in the slide-way remote from the mouth thereof, engaging the top edge of said stem section, and a stop on said stem section at its upper edge for engagement with said last mentioned bearing to limit the outward movement of said stem section with respect to said sleeve-like section.

PAUL S. ENDACOTT.